United States Patent
Kim

(10) Patent No.: US 12,459,471 B2
(45) Date of Patent: Nov. 4, 2025

(54) METHOD AND APPARATUS FOR ELECTRO-MECHANICAL BRAKE SYSTEM

(71) Applicant: HYUNDAI MOBIS CO., LTD., Seoul (KR)

(72) Inventor: Jong Sung Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 185 days.

(21) Appl. No.: 18/217,777

(22) Filed: Jul. 3, 2023

(65) Prior Publication Data
US 2024/0010174 A1 Jan. 11, 2024

(30) Foreign Application Priority Data
Jul. 6, 2022 (KR) .......................... 10-2022-0083312

(51) Int. Cl.
*F16D 66/02* (2006.01)
*B60T 8/171* (2006.01)
*B60T 8/172* (2006.01)
*B60T 13/74* (2006.01)
(Continued)

(52) U.S. Cl.
CPC .............. *B60T 8/171* (2013.01); *B60T 8/172* (2013.01); *B60T 13/746* (2013.01); *B60T 17/22* (2013.01); *F16D 66/027* (2013.01); *F16D 2066/006* (2013.01)

(58) Field of Classification Search
CPC ........ B60T 8/171; B60T 8/172; B60T 13/746; B60T 17/22; F16D 66/027; F16D 2066/006
See application file for complete search history.

(56) References Cited

U.S. PATENT DOCUMENTS

| | | | |
|---|---|---|---|
| 6,471,015 B1 * | 10/2002 | Ralea ...................... | F16D 65/56 188/1.11 W |
| 10,655,696 B2 * | 5/2020 | Schoenauer ............ | B60T 8/171 |
| 2020/0072308 A1 * | 3/2020 | Kocjan ................. | B60T 13/741 |

* cited by examiner

*Primary Examiner* — Gonzalo Laguarda
(74) *Attorney, Agent, or Firm* — Morgan, Lewis & Bockius LLP

(57) ABSTRACT

The present disclosure provides an electric brake apparatus having an electro-mechanical brake disposed in each wheel of a vehicle and configured to perform braking control of the vehicle, the electric brake apparatus including a friction pad configured to press a brake disc of each wheel; a pressing unit configured to generate a clamping force by pressing the friction pad against the brake disc; a motor configured to generate a rotational force and transmit the rotational force to the pressing unit; a current sensor mounted on the electro-mechanical brake to measure current flowing through the motor; a motor rotation angle sensor mounted on the electro-mechanical brake to detect a rotation angle of the motor and output a rotation angle signal; and a main controller configured to calculate an actual motor current based on a voltage signal input from the current sensor, calculate an actual stroke using the rotation angle signal input from the motor rotation angle sensor, determine whether or not the friction pad is worn using the actual motor current and the actual stroke, calculate an amount of friction pad wear when determination is made that the friction pad is worn, calculate a target stroke using the amount of friction pad wear, and perform the braking control of the vehicle based on the target stroke.

20 Claims, 10 Drawing Sheets

(51) Int. Cl.
*B60T 17/22* (2006.01)
*F16D 66/00* (2006.01)

METHOD AND APPARATUS FOR ELECTRO-MECHANICAL BRAKE SYSTEM

CROSS-REFERENCE TO RELATED APPLICATION

The present application claims priority to Patent Application No. 10-2022-0083312, filed on Jul. 6 2022 in Korea, the entire contents of which are incorporated herein by reference.

TECHNICAL FIELD

The present disclosure relates to an electric brake device and a control method thereof.

BACKGROUND

The contents described in the present disclosure simply provide background information for the present disclosure and do not constitute prior art.

In the electro-mechanical brake (EMB), a pressing unit that receives a rotational force of the motor presses a friction pad against the brake disc to generate a clamping force.

An electric brake device determines a target clamping force for a required braking force generated based on a pedal effort of a brake pedal, and operates the EMB to perform braking control of the vehicle by controlling the target clamping force.

The EMB may detect an actual clamping force by mounting a force sensor inside a caliper housing. The electric brake device may control the target clamping force by receiving the feedback of an actual clamping force signal from the force sensor. However, when the force sensor is mounted on the EMB, a structure of a portion where the force sensor is mounted becomes complicated and manufacturing cost increases.

Accordingly, recent electric brake devices perform the target clamping force control using a motor rotation angle sensor and current sensor mounted for EMB motor drive control without a force sensor.

Meanwhile, in EMB, as wear of the friction pad progresses, the contact point, which is the point where the friction pad comes into contact with the brake disc and the clamping force is generated, moves.

Such a conventional electric brake device measures the actual stroke and actual motor current for a plurality of check points every time EMB is initiated to generate reference data, thereby compensating for the movement of the contact point due to wear.

However, since the conventional electric brake device cannot compensate for the movement of the contact point due to wear of the friction pad generated during traveling of a vehicle, there is a disadvantage in that the clamping force control cannot be precisely performed.

SUMMARY

The present disclosure provides an electric brake device and a control method thereof capable of increasing precision of clamping force control by compensating for the movement of a contact point due to wear occurring during traveling of a vehicle.

The problems to be solved by the present disclosure are not limited to the problems mentioned above, and other problems not mentioned will be clearly understood by those skilled in the art from the description below.

An embodiment of the present disclosure provides a method of braking control of a vehicle having an electro-mechanical brake disposed in each wheel of the vehicle, the method including generating an actual motor current of each wheel and an actual stroke of each wheel by collecting a voltage signal from a current sensor and a motor rotation angle sensor mounted on the electro-mechanical brake; determining whether a friction pad wear compensation function of each wheel is activated based on the actual motor current of each wheel and the actual stroke of each wheel; determining a friction pad state of each wheel using the actual motor current of each wheel, the actual stroke of each wheel, and reference data of the electro-mechanical brake, in a case in which the friction pad wear compensation function is activated; calculating an amount of friction pad wear of each wheel using the actual motor current of each wheel, the actual stroke of each wheel, and the reference data of the electro-mechanical brake and calculating a target stroke of each wheel using the amount of the friction pad wear of each wheel, in a case in which the friction pad state of each wheel is worn; and performing braking control of the vehicle based on the target stroke of each wheel.

An embodiment of the present disclosure provides an electric brake apparatus having an electro-mechanical brake disposed in each wheel of a vehicle and configured to perform braking control of the vehicle, the electric brake apparatus including a friction pad configured to press a brake disc of each wheel; a pressing unit configured to generate a clamping force by pressing the friction pad against the brake disc; a motor configured to generate a rotational force and transmit the rotational force to the pressing unit; a current sensor mounted on the electro-mechanical brake to measure current flowing through the motor; a motor rotation angle sensor mounted on the electro-mechanical brake to detect a rotation angle of the motor and output a rotation angle signal; and a main controller configured to calculate an actual motor current based on a voltage signal input from the current sensor, calculate an actual stroke using the rotation angle signal input from the motor rotation angle sensor, determine whether or not the friction pad is worn using the actual motor current and the actual stroke, calculate an amount of friction pad wear when determination is made that the friction pad is worn, calculate a target stroke using the amount of friction pad wear, and perform the braking control of the vehicle based on the target stroke.

According to the electric brake device and the control method thereof of one embodiment of the present disclosure, it is possible to improve precision and quality of clamping force control by compensating for the movement of the contact point due to wear occurring during traveling of a vehicle.

DETAILED DESCRIPTION

Figure 1:
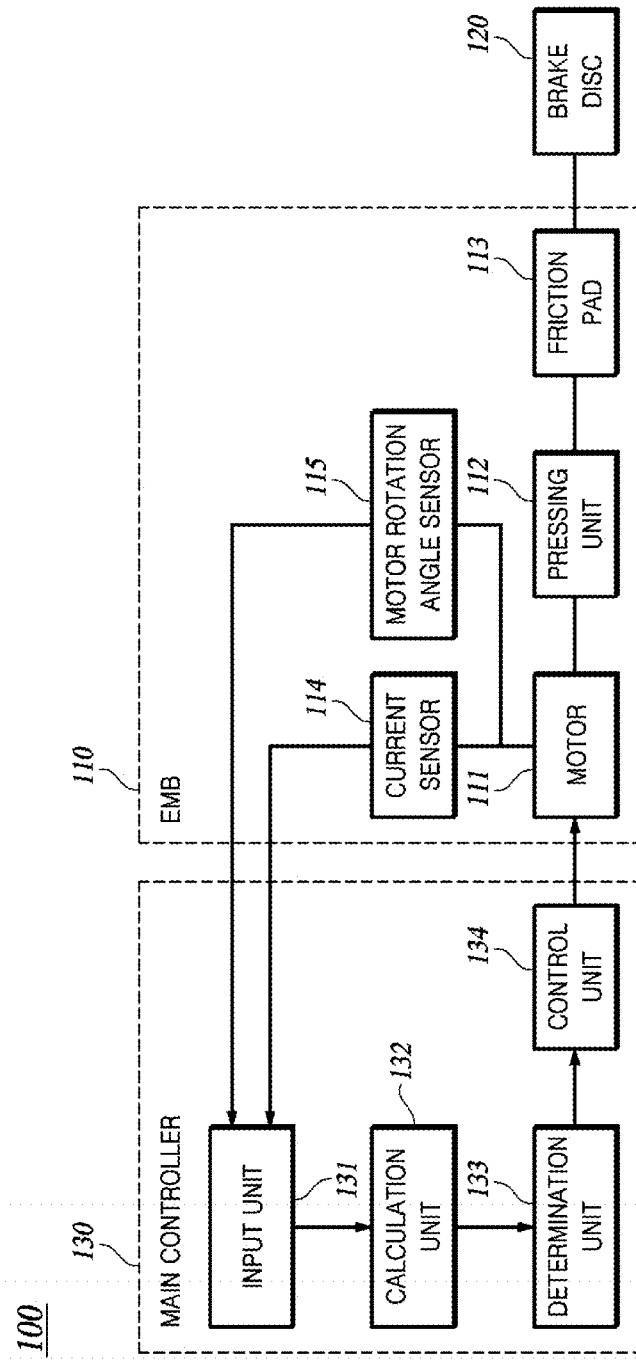
FIG. 1 is a schematic block diagram of an electric brake device according to one embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

FIG. 1 is a schematic block diagram of an electric brake device according to one embodiment of the present disclosure.

Referring to FIG. 1, an electric brake device 100 according to one embodiment of the present disclosure may include all or some of an electro-mechanical brake 110, a brake disc 120, and a main controller 130.

The EMB 110 may include all or some of a motor 111, a pressing unit 112, a friction pad 113, a current sensor 114, and a motor rotation angle sensor 115.

The motor 111 generates rotational force based on pedal effort of a brake pedal.

The pressing unit 112 may include all or some of a gearbox (not illustrated), a screw (not illustrated), a nut (not illustrated), and a piston (not illustrated).

A rotational force generated by the motor 111 is boosted by the gearbox, and the screw converts the boosted rotational force into linear motion to pressurize the piston. The nut is arranged in a state in which rotation is limited. When the pressing unit 112 presses the friction pad 113 against the brake disc 120, a clamping force is generated. Here, a point at which the clamping force starts to occur is a contact point.

As the pressing unit 112 moves from the contact point to the brake disc 120 side, the clamping force increases. The friction pad 113 is disposed on both side surfaces of the brake disc 120, and the pressing unit 112 presses the friction pad 113 against the brake disc 120 from both sides to generate the clamping force.

The current sensor 114 may be mounted on a motor driving circuit to measure an actual current flowing through the motor 111. For example, the actual motor current may be measured by detecting a voltage drop between both ends of a shunt resistor mounted on the motor driving circuit.

The motor rotation angle sensor 115 detects a motor rotation angle and outputs a rotation angle signal. For example, the motor rotation angle sensor 115 may convert a sine signal and a cosine signal indicating the motor rotation angle into a voltage signal and output the converted voltage signal.

The main controller 130 may include all or some of an input unit 131, a calculation unit 132, a determination unit 133, and a control unit 134.

The main controller 130 according to an exemplary embodiment of the present disclosure may be a processor (e.g., computer, microprocessor, CPU, ASIC, circuitry, logic circuits, etc.). The main controller 130 may be implemented by a non-transitory memory storing, e.g., a program(s), software instructions reproducing algorithms, etc., which, when executed, performs various functions described hereinafter, and a processor configured to execute the program (s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

The input unit 131 measures a value of a voltage drop indicating the actual motor current from the current sensor 114, and collects a voltage signal indicating the motor rotation angle from the motor rotation angle sensor 115.

The calculation unit 132 calculates the actual motor current of each wheel based on the voltage drop value indicating the actual motor current, and calculates a motor absolute rotation angle based on a voltage signal indicating the motor rotation angle. The calculation unit 132 calculates the actual stroke of each wheel using the motor absolute rotation angle, and design specifications of a gear and a screw mechanism.

The determination unit 133 determines the friction pad state of each wheel using the actual motor current and actual stroke, and calculates an amount of friction pad wear of each wheel when the friction pad is worn. The determination unit 133 calculates a target stroke of each wheel using the amount of friction pad wear of each wheel.

The control unit 134 performs braking control based on the target stroke of each wheel.

Figure 2:
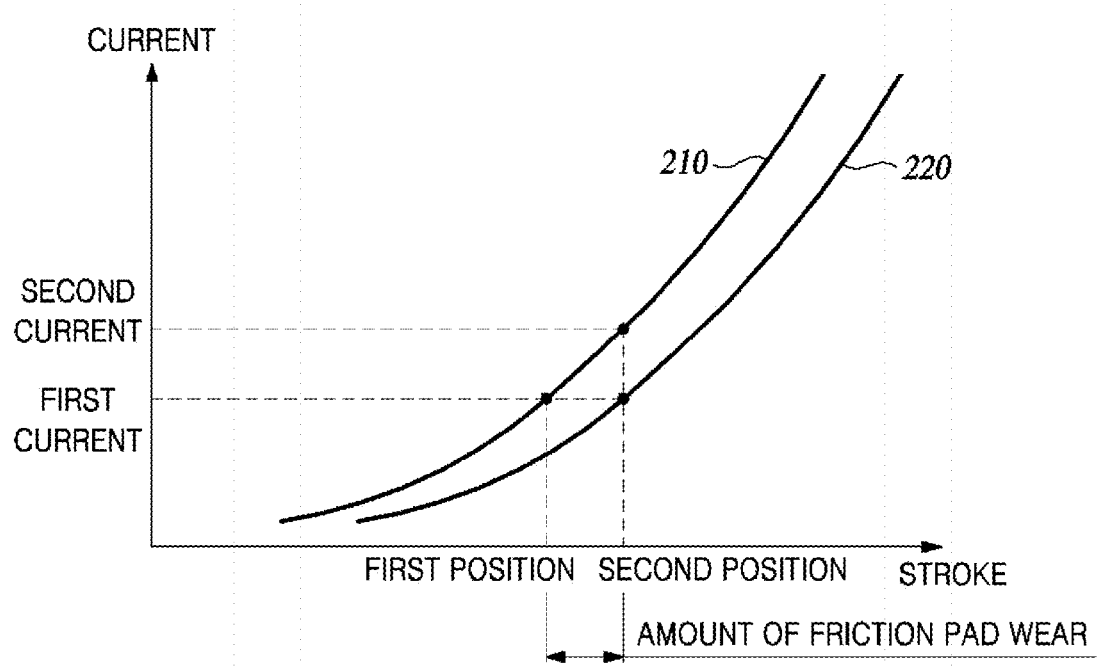
FIG. 2 is a graph illustrating that a friction pad of the electric brake device according to one embodiment of the present disclosure is worn to form a stroke-motor current curve by parallel movement from reference data generated every time EMB is initialized.

FIG. 2 is a graph illustrating that the friction pad of the electric brake device according to one embodiment of the present disclosure is worn to form a stroke-motor current curve by parallel movement from reference data generated every time the EMB is initialized.

Referring to FIG. 1 and FIG. 2, the electric brake device 100 measures the actual stroke and the actual motor current for the plurality of check points every time the EMB 110 is initialized to generate the reference data 210 and compensate for the movement of the contact point caused by the wear.

However, when the friction pad 113 is worn during the traveling of the vehicle, the stroke-motor current curve 220 of the electric brake device 100 may be formed by parallel movement from the reference data 210 by an amount of wear of the friction pad.

When the friction pad 113 is worn, the contact point is moved in the pressing direction by the amount of wear of the friction pad. For example, when the stroke of the pressing unit is at a second position, the actual motor current is the first current. Meanwhile, it can be seen that the reference motor current corresponding to the second position is a second current from the reference data and is greater than the first current. This is because the actual motor consumption current is reduced due to the movement of the contact point in the pressing direction by the amount of wear of the friction pad.

In addition, when the stroke of the pressing unit is at the second position, it can be seen that the reference stroke corresponding to the actual motor current is at the first position and is smaller than the second position. Here, the difference between the first position and the second position is the amount of wear of the friction pad.

Figure 3:
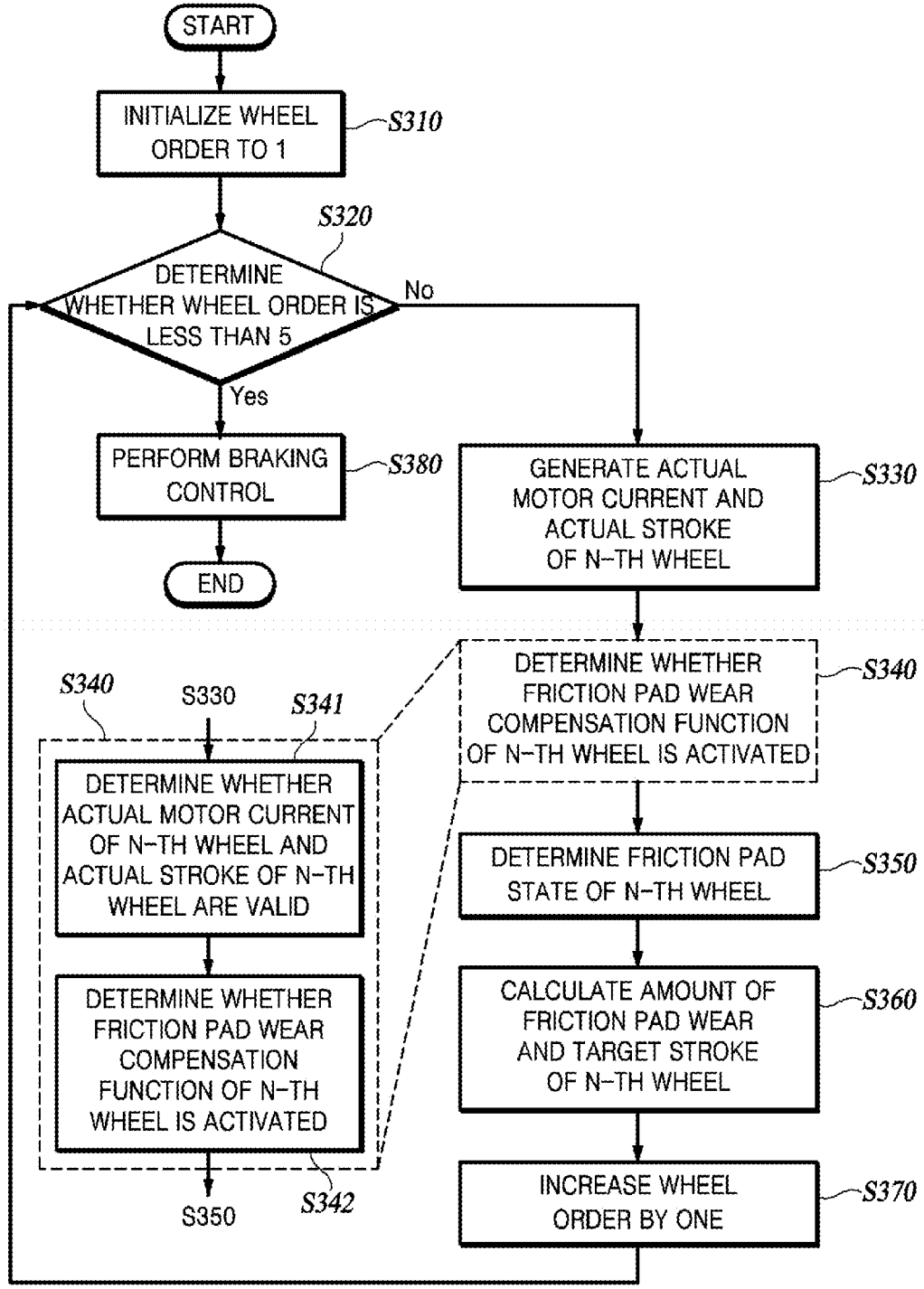
FIG. 3 is a flowchart illustrating a process of a friction pad wear compensation function of the electric brake device according to one embodiment of the present disclosure.

FIG. 3 is a flowchart illustrating a process of a friction pad wear compensation function of an electric brake device according to one embodiment of the present disclosure.

Referring to FIGS. 1 to 3, for example, when the number of wheels of a vehicle is set to 4, a Front-Left (FL) wheel may be defined as a first wheel, a Front-Right (FR) wheel may be defined as a second wheel, a Rear-Left (RL) wheel may be defined as a third wheel, and a Rear-Right (RR) wheel may be defined as a fourth wheel.

Since the main controller 130 performs the friction pad wear compensation function starting with the first wheel (n is a natural number), a wheel order is initialized to 1 (S310).

Since the main controller 130 performs the friction pad wear compensation function up to the fourth wheel, it is determined whether the wheel order is less than 5 (S320).

When it is determined that the wheel order is less than 5 in Step S320, the input unit 131 measures a value of a voltage drop indicating actual motor current from the current sensor 114 mounted on the EMB of the n-th wheel. The input unit 131 collects a voltage signal indicating a motor rotation angle from the motor rotation angle sensor 115 mounted on the EMB of the n-th wheel.

The calculation unit 132 calculates the actual motor current of the n-th wheel based on the measured value of the voltage drop of the n-th wheel. The calculation unit 132 calculates the motor absolute rotation angle of the n-th wheel based on the voltage signal of the n-th wheel and calculates the actual stroke of the n-th wheel using the motor absolute rotation angle of the n-th wheel and design specifications of the gear and screw mechanism (S330).

The determination unit 133 determines whether the friction pad wear compensation function of the n-th wheel is activated using the actual motor current of the n-th wheel and the actual stroke of the n-th wheel (S340).

The determination unit 133 determines whether the actual motor current of the n-th wheel and the actual stroke of the n-th wheel are valid for activating the friction pad wear compensation function of the n-th wheel (S341).

When it is determined that the actual motor current of the n-th wheel and the actual stroke of the n-th wheel are valid, the determination unit 133 determines whether the friction pad wear compensation function of the n-th wheel is activated (S342).

When it is determined that the friction pad wear compensation function of the n-th wheel is activated, the determination unit 133 determines the friction pad state of the n-th wheel (S350).

When it is determined that the friction pad state of the n-th wheel is worn, the determination unit 133 calculates the amount of friction pad wear of the n-th wheel and calculates the target stroke of the n-th wheel (S360).

Since the main controller 130 sequentially performs the friction pad wear compensation function from the first wheel to the fourth wheel, the wheel order is increased by one (S370).

When it is determined that the wheel order is greater than or equal to 5 in Step S320, the control unit 134 performs the braking control based on the target stroke of the n-th wheel (S380).

Figure 4:
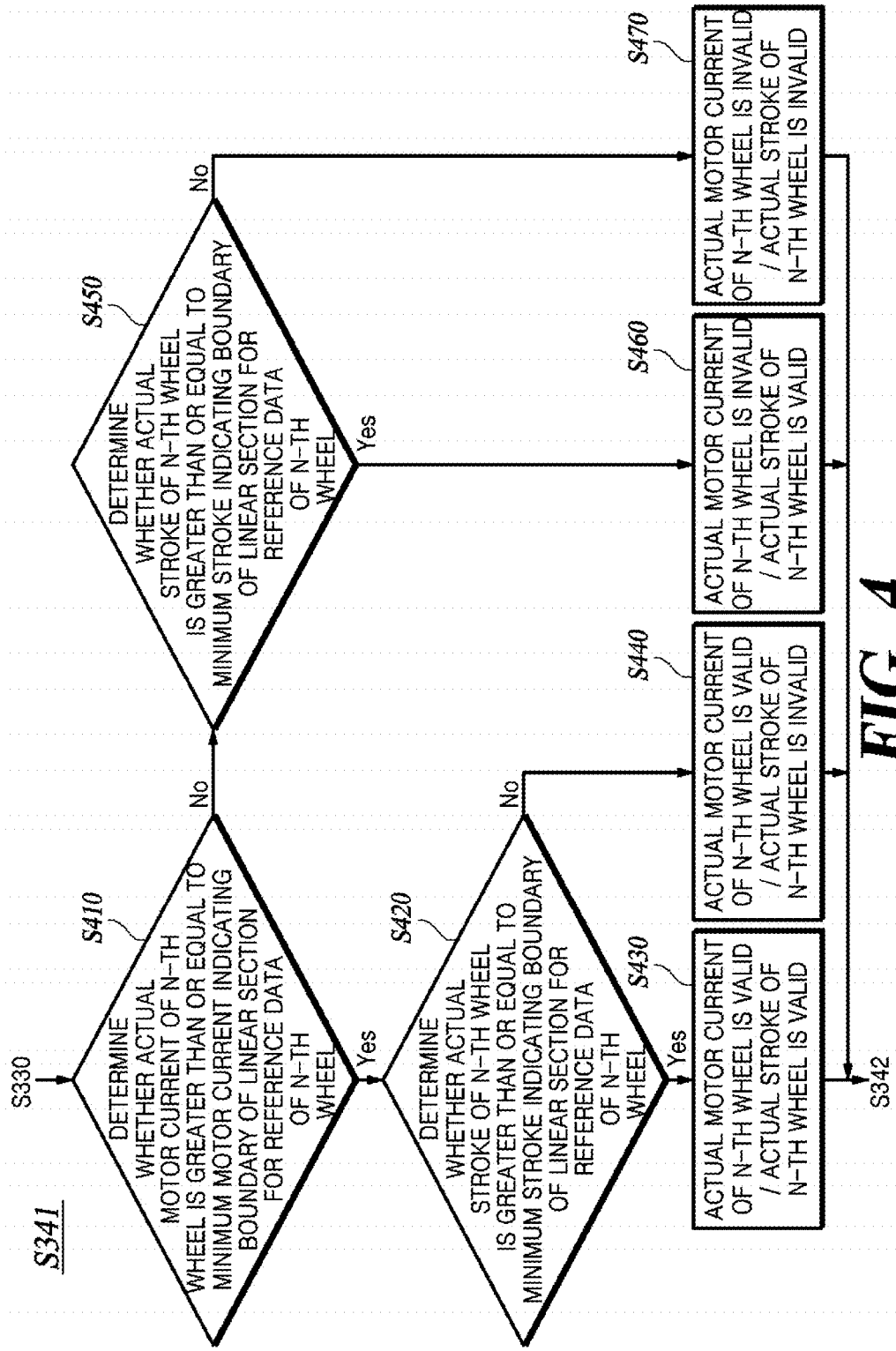
FIG. 4 is a flowchart illustrating Step S341 of FIG. 3 in detail.

FIG. 4 is a flowchart illustrating Step S341 of FIG. 3 in detail.

Referring to FIGS. 1 to 4, the determination unit 133 determines whether the actual motor current of the n-th wheel is greater than or equal to a minimum motor current indicating a boundary of a linear section for the reference data of the n-th wheel (S410).

When it is determined in Step S410 that the actual motor current of the n-th wheel is greater than or equal to the minimum motor current indicating the boundary of the linear section for the reference data of the n-th wheel, the determination unit 133 determines whether the actual stroke of the n-th wheel is greater than or equal to the minimum stroke indicating the boundary of the linear section for the reference data of the n-th wheel (S420).

When it is determined in Step S420 that the actual stroke of the n-th wheel is greater than or equal to the minimum stroke indicating the boundary of the linear section for the reference data of the n-th wheel, the determination unit 133 determines that the actual motor current of the n-th wheel and that the actual stroke of the n-th wheel are valid (S430).

When it is determined in Step S420 that the actual stroke of the n-th wheel is smaller than the minimum stroke indicating the boundary of the linear section for the reference data of the n-th wheel, the determination unit 133 determines that the actual motor current of the n-th wheel is valid and that the actual stroke of the n-th wheel is invalid (S440).

When it is determined in Step S410 that the actual motor current of the n-th wheel is smaller than the minimum motor current indicating the boundary of the linear section for the reference data of the n-th wheel, the determination unit 133 determines whether the actual stroke of the n-th wheel is greater than or equal to the minimum stroke indicating the boundary of the linear section for the reference data of the n-th wheel (S450).

When it is determined in Step S450 that the actual stroke of the n-th wheel is greater than or equal to the minimum stroke indicating the boundary of the linear section for the reference data of the n-th wheel, the determination unit 133 determines that the actual motor current of the n-th wheel is invalid and that the actual stroke of the n-th wheel is valid (S460).

When it is determined in Step S450 that the actual stroke of the n-th wheel is smaller than the minimum stroke indicating the boundary of the linear section for the reference data of the n-th wheel, the determination unit 133 determines that the actual motor current of the n-th wheel and the actual stroke of the n-th wheel are invalid (S470).

Figure 5:
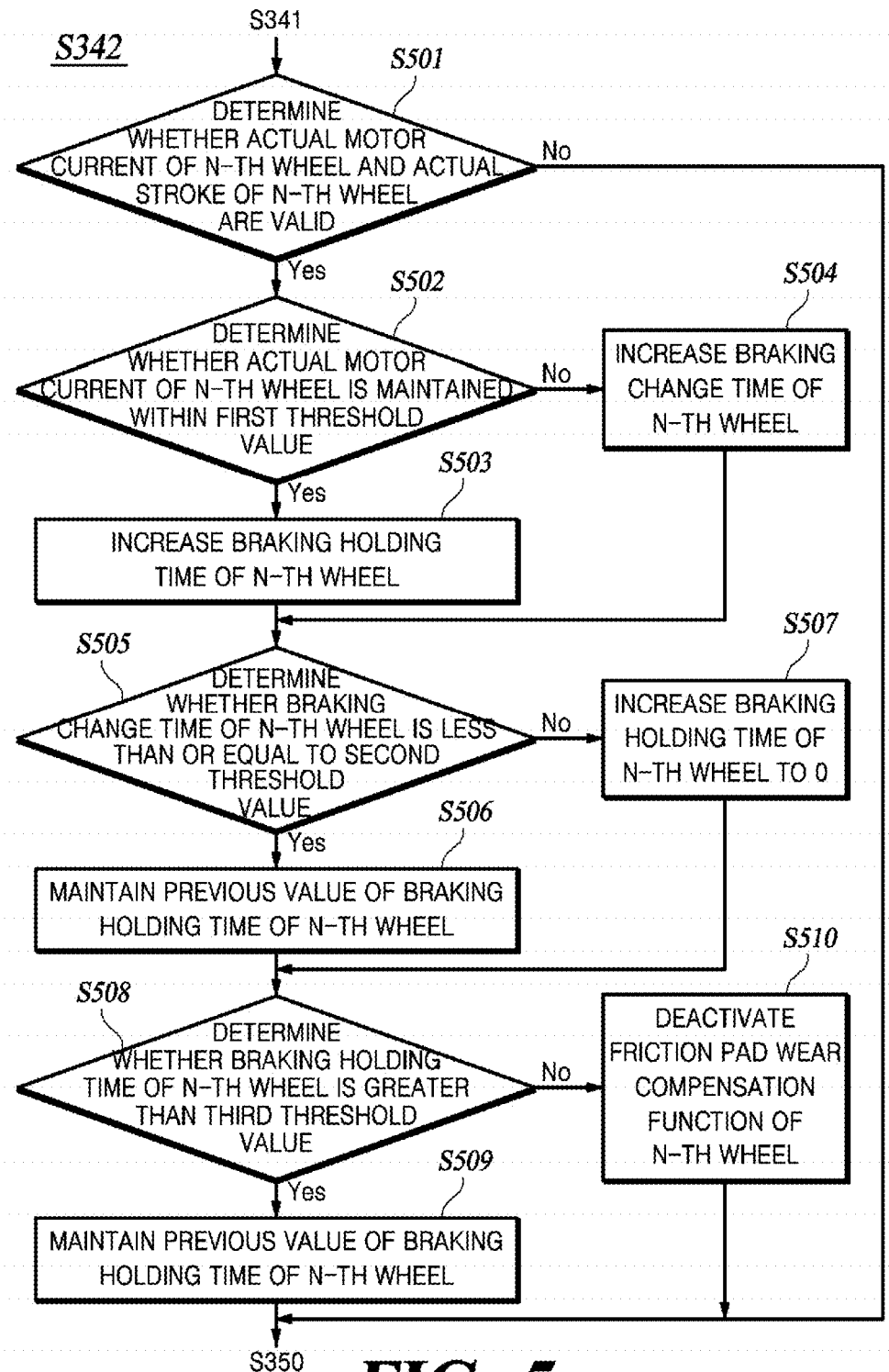
FIG. 5 is a flowchart illustrating Step S342 of FIG. 3 in detail.

FIG. 5 is a flowchart illustrating Step S342 of FIG. 3 in detail.

Referring to FIGS. 1 to 5, the determination unit 133 determines whether the actual motor current of the n-th wheel and the actual stroke of the n-th wheel are valid (S501).

When it is determined in Step S501 that the actual motor current of the n-th wheel and the actual stroke of the n-th wheel are valid, the determination unit 133 determines whether the actual motor current of the n-th wheel is maintained within the first threshold value (S502).

For example, in the case of the electric brake device 100 without a force sensor, consumed current in a pressurization section and consumed current in the decompression section may be different from each other even at a point at which the same clamping force is generated. In addition, consumed current in the pressurization or decompression section is also affected by an operating speed of the pressing unit 112. Therefore, the friction pad wear compensation function is activated to be limited to a current maintaining section where the braking force is kept constant in order to minimize the error of wear compensation.

When it is determined in Step S502 that the actual motor current of the n-th wheel is maintained within the first threshold value, the determination unit 133 increases a braking holding time of the n-th wheel (S503).

When the actual motor current of the n-th wheel is not maintained within the first threshold value in Step S502, the determination unit 133 increases a braking change time of the n-th wheel (S504).

The determination unit 133 determines whether the braking change time of the n-th wheel is less than or equal to the second threshold value (S505).

When it is determined in Step S505 that the braking change time of the n-th wheel is less than or equal to the second threshold value, the determination unit 133 maintains the braking holding time of the n-th wheel as the previous value (S506).

When it is determined in Step S505 that the braking change time of the n-th wheel is greater than the second threshold value, the determination unit 133 initializes the braking holding time of the n-th wheel to 0 (S507).

The determination unit 133 determines whether the braking holding time of the nth wheel is greater than the third threshold value (S508).

When it is determined in Step S508 that the braking holding time of the n-th wheel is greater than the third threshold value, the determination unit 133 activates the friction pad wear compensation function of the n-th wheel (S509).

When it is determined in Step S508 that the braking holding time of the n-th wheel is less than or equal to the third threshold value, the determination unit 133 deactivates the friction pad wear compensation function of the n-th wheel (S510).

Figure 6:
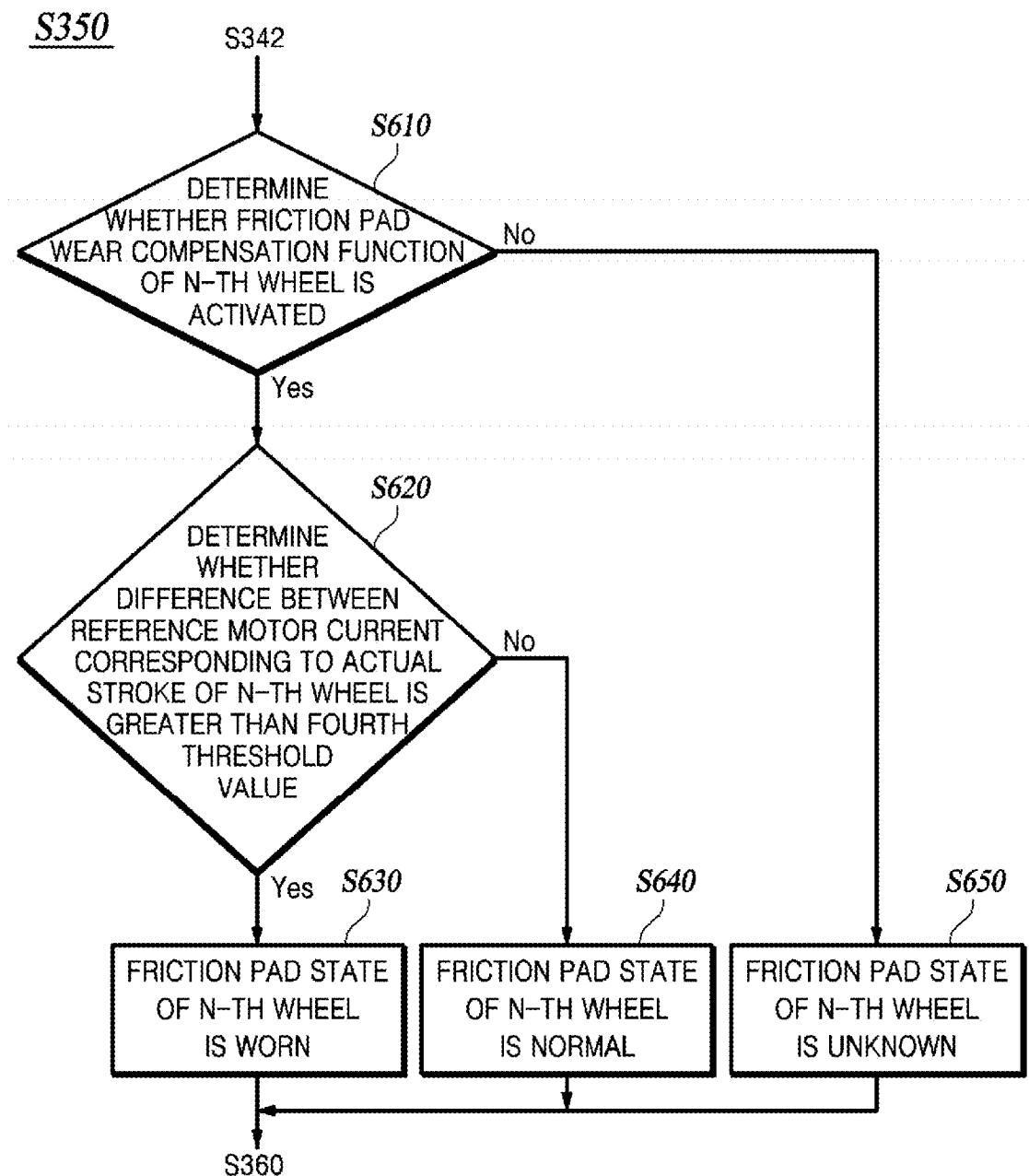
FIG. 6 is a flowchart illustrating Step S350 of FIG. 3 in detail.

FIG. 6 is a flowchart illustrating Step S350 of FIG. 3 in detail.

Referring to FIGS. 1 to 6, the determination unit 133 determines whether the friction pad wear compensation function of the n-th wheel is activated (S610).

When it is determined in Step S610 that the friction pad wear compensation function of the n-th wheel is activated, the determination unit 133 determines whether a difference between the reference motor current corresponding to the actual stroke of the n-th wheel and the actual motor current of the n-th wheel is greater than a fourth threshold value (S620).

When it is determined in Step S620 that the difference between the reference motor current corresponding to the actual stroke of the n-th wheel and the actual motor current of the n-th wheel is greater than the fourth threshold value, the determination unit 133 determines that the friction pad of the n-th wheel is worn (S630).

When it is determined in Step S620 that the difference between the reference motor current corresponding to the actual stroke of the n-th wheel and the actual motor current of the n-th wheel is smaller than or equal to the fourth threshold value, the determination unit 133 determines that the friction pad state of the n-th wheel is normal (S640).

When it is determined in Step S610 that the friction pad wear compensation function of the n-th wheel is not activated, the determination unit 133 determines that the friction pad state of the n-th wheel is undefined (S650).

Figure 7:
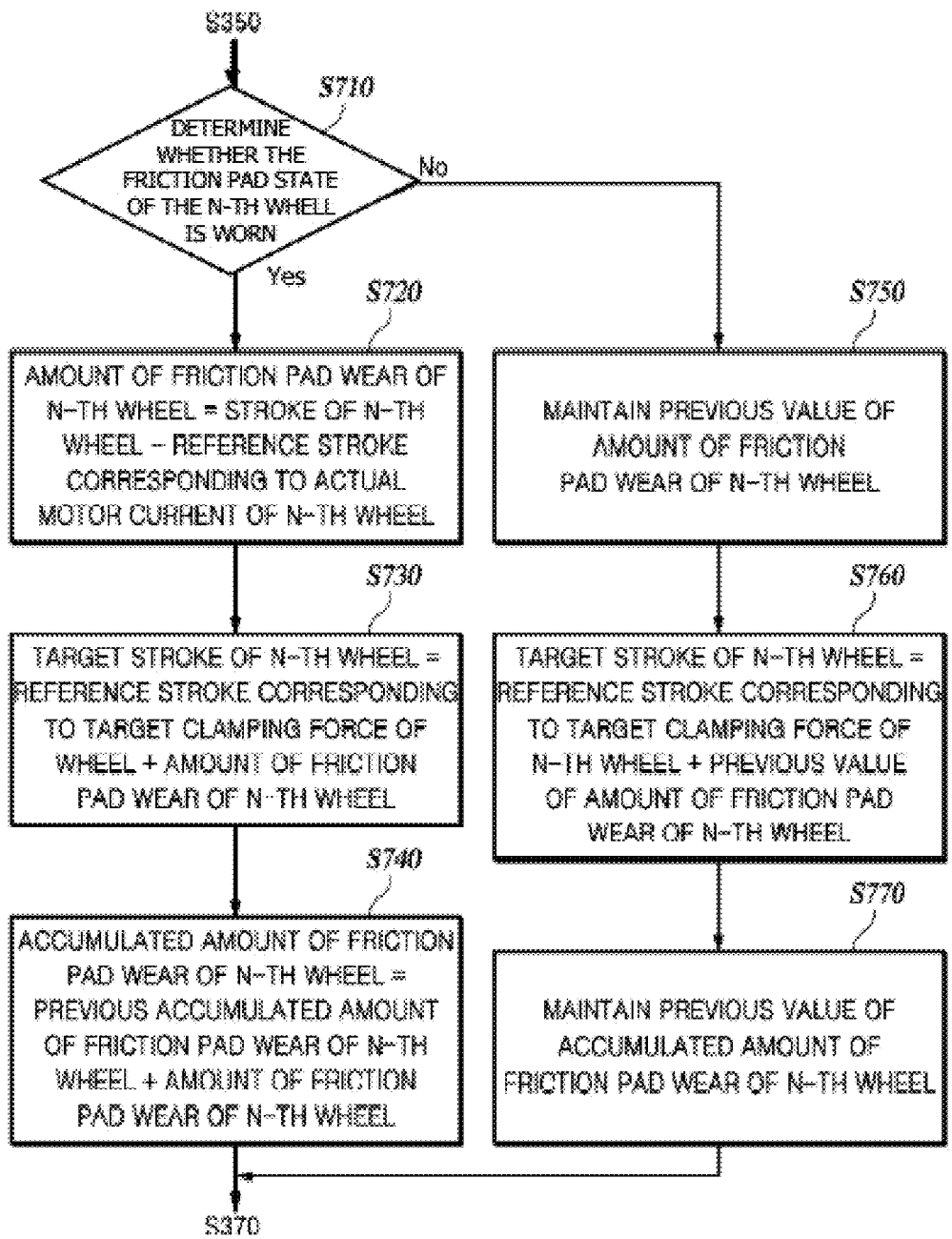
FIG. 7 is a flowchart illustrating Step S360 of FIG. 3 in detail.

FIG. 7 is a flowchart illustrating Step S360 of FIG. 3 in detail.

Referring to FIGS. 1 to 7, the determination unit 133 determines whether the friction pad state of the n-th wheel is worn (S710).

When it is determined in Step S710 that the friction pad state of the n-th wheel is worn, the determination unit 133 calculates the amount of friction pad wear of the n-th wheel as a difference between the stroke of the n-th wheel and the reference stroke corresponding to the actual motor current of the n-th wheel (S720), calculates the target stroke of the n-th wheel as a sum of the reference stroke corresponding to the target clamping force of the n-th wheel and the amount of friction pad wear of the n-th wheel (S730), and calculates an accumulated amount of friction pad wear of the n-th wheel as a sum of a previous accumulated amount of friction pad wear of the n-th wheel and the amount of friction pad wear of the n-th wheel (S740).

When it is determined in Step S710 that the friction pad state of the n-th wheel is not worn, the determination unit 133 maintains the previous value of the amount of friction pad wear of the n-th wheel (S750), calculates the target stroke of the n-th wheel as a sum of the reference stroke corresponding to the target clamping force of the n-th wheel and the previous value of the amount of friction pad wear of the n-th wheel (S760), and the accumulated amount of friction pad wear of the n-th wheel is maintained as the previous value (S770). For example, before the electric brake device 100 is shut down, values of the amount of friction pad wear of the n-th wheel and the accumulated amount of friction pad wear are stored in a non-volatile memory. When the electric brake device 100 wakes up and the EMB initialization is completed, the determination unit 133 retrieves the values of the amount of friction pad wear and the accumulated amount of friction pad wear of the n-th wheel stored in the non-volatile memory and calculates the target stroke of the n-th wheel.

Figure 8:
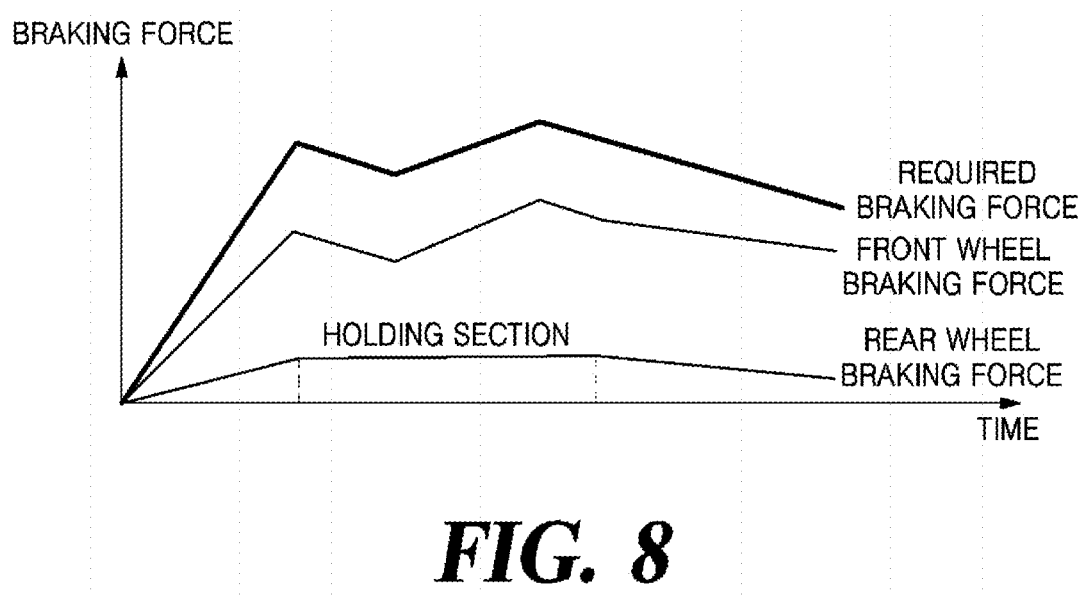
FIG. 8 is a graph illustrating wear compensation coordinated braking control of the electric brake device according to one embodiment of the present disclosure.

FIG. 8 is a graph illustrating wear compensation coordinated braking control of the electric brake device according to one embodiment of the present disclosure.

Referring to FIGS. 1 to 8, for example, when a required braking force is changed due to a change in pedal effort of the brake pedal during the traveling of the vehicle, a friction pad wear compensation function may be deactivated. To prevent this, the electric brake device 100 performs the wear compensation coordinated braking control.

The wear compensation coordinated braking control provides a function of maintaining a constant braking force for either the front wheels or the rear wheels for which friction pad wear compensation is required. In addition, the wear compensation coordinated braking control provides a control function to follow the required braking force for other wheels for which wear compensation of the friction pad is not required.

Figure 9:
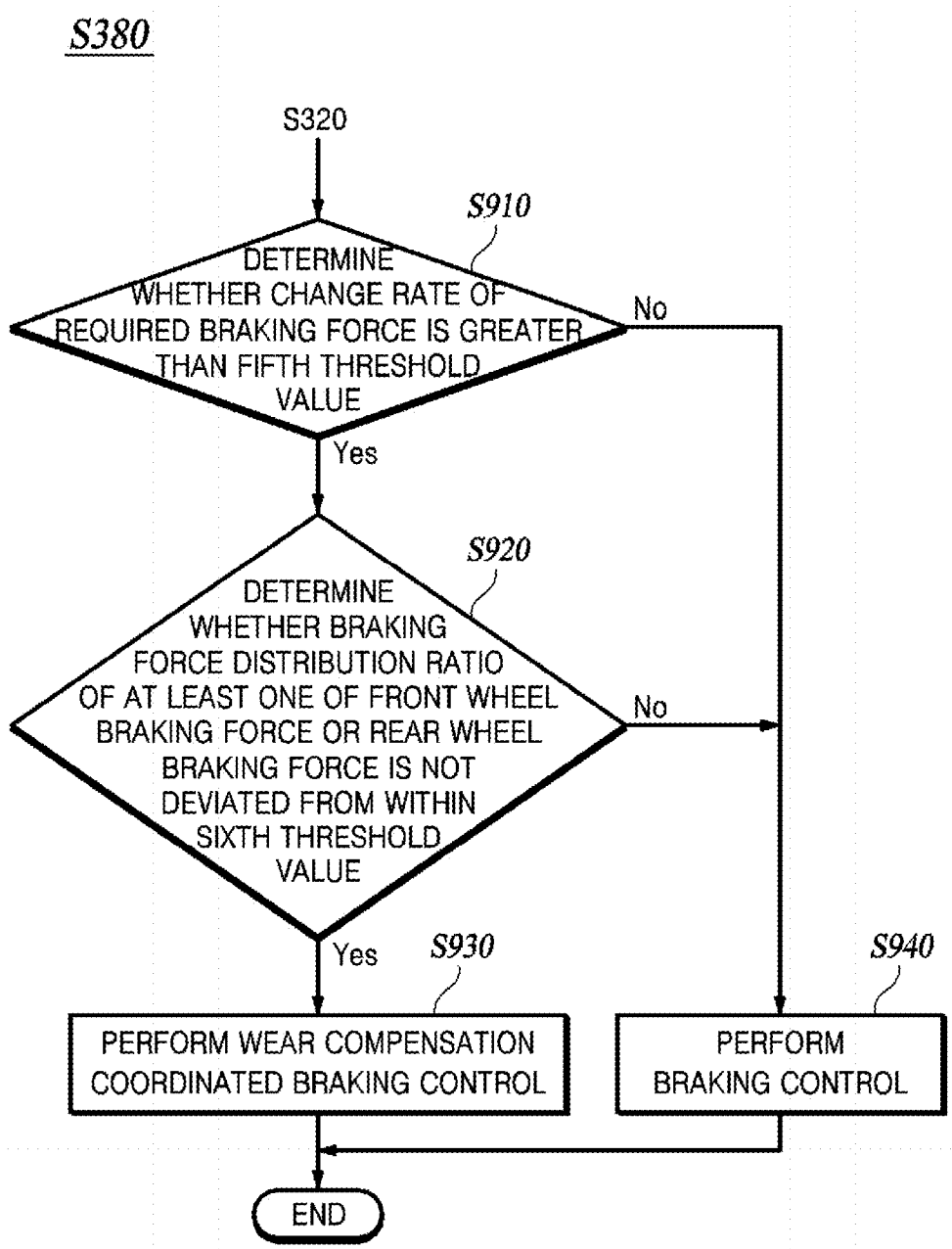
FIG. 9 is a flowchart illustrating Step S380 of FIG. 3 in detail.

FIG. 9 is a flowchart illustrating Step S380 of FIG. 3 in detail.

Referring to FIGS. 1 to 9, the determination unit 133 determines whether the change rate of the required braking force is greater than a fifth threshold value (S910).

When it is determined in Step S910 that the change rate of the required braking force is greater than the fifth threshold value, the determination unit 133 determines whether a braking force distribution ratio of at least one of a front wheel braking force and a rear wheel braking force does not deviate from within a sixth threshold value (S920).

When it is determined in Step S920 that the braking force distribution ratio of at least one of the front wheel braking force or the rear wheel braking force does not deviate from within the sixth threshold value, the control unit 134 performs the wear compensation coordinated braking control (S930).

When it is determined in Step S910 that the change rate of the required braking force is less than or equal to the fifth threshold value or when it is determined in Step S920 that the braking force distribution ratio of at least one of the front wheel braking force or rear wheel braking force deviates from within the sixth threshold value, the control unit 134 performs the braking control (S940). For example, during braking on an icy road, wheel lock may occur due to an increase in braking slip rate caused by the wear compensation coordinated braking control. In order to prevent this, in the wear compensation coordinated braking control, when the braking force distribution ratio of at least one of the front wheel braking force or the rear wheel braking force deviates from within the sixth threshold value, the control unit 134 stops the wear compensation coordinated braking control and performs the braking control for a low-friction road surface.

Figure 10:
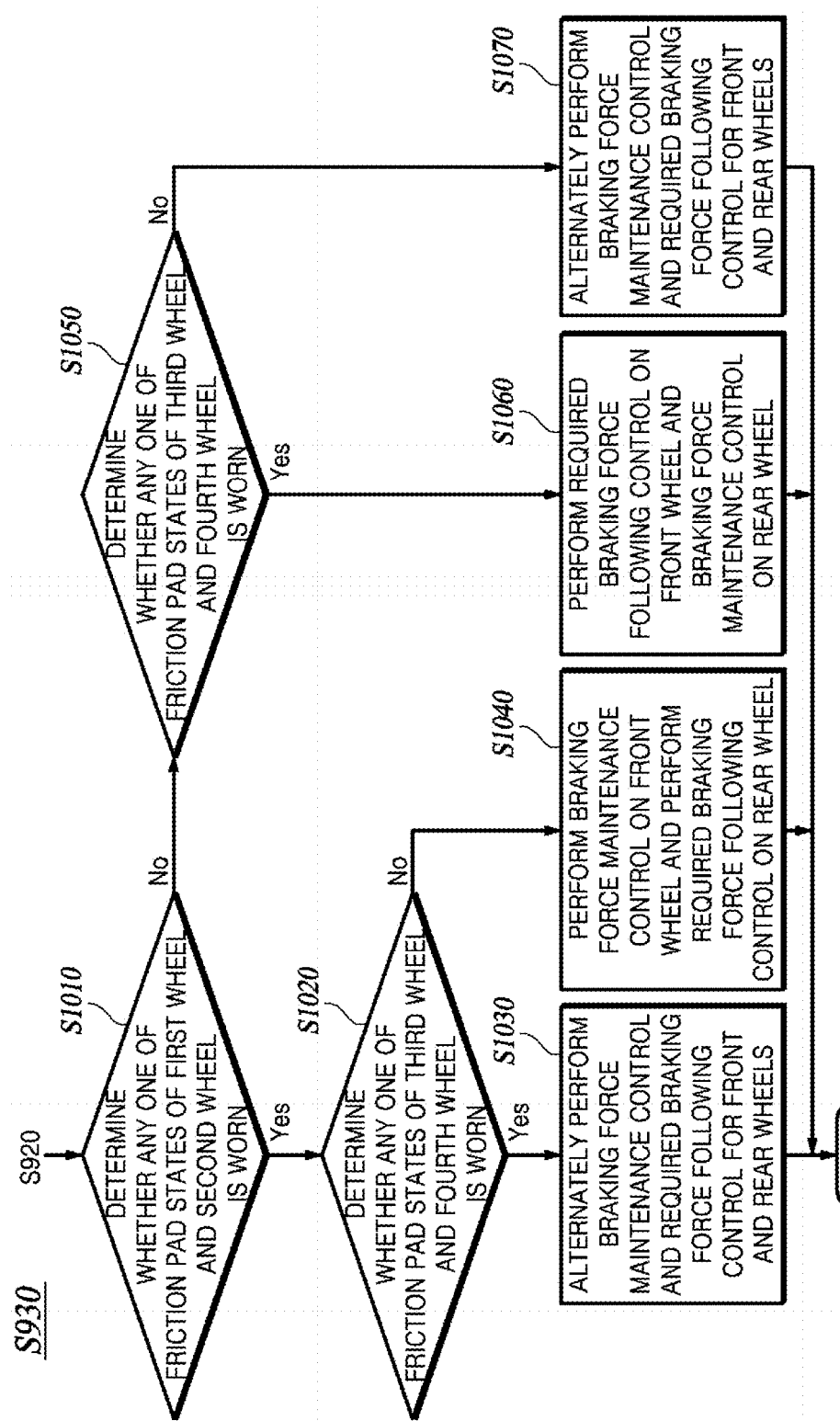
FIG. 10 is a flowchart illustrating Step S930 of FIG. 9 in detail.

FIG. 10 is a flowchart illustrating Step S930 of FIG. 9 in detail.

Referring to FIGS. 1 to 10, the control unit 134 determines whether any one of the friction pad states of the first wheel and the second wheel is worn (S1010).

When it is determined in Step S1010 that any one of the friction pad states of the first wheel and the second wheel is worn, the control unit 134 determines whether any one of friction pad states of a third wheel and a fourth wheel is worn (S1020).

When it is determined in Step S1020 that any one of the friction pads of the third wheel and the fourth wheel is worn, the control unit 134 alternately performs the braking force maintenance control and the required braking force following control for the front and rear wheels (S1030). For example, when wear of the friction pads of the front and rear wheels is detected, the control unit 134 alternately performs the braking force maintenance control and the required braking force following control for the front and rear wheels at specific cycles in order to improve the accuracy of the friction pad wear compensation.

When it is determined in Step S1020 that the friction pad states of the third and fourth wheels are not worn, the control unit 134 performs the braking force maintenance control on the front wheel and performs the required braking force following control on the rear wheel (S1040).

When it is determined in Step S1010 that the friction pad states of the first wheel and the second wheel are not worn, the control unit 134 determines whether any one of the friction pad states of the third wheel and the fourth wheel is worn (S1050).

When it is determined in Step S1050 that any one of the friction pad states of the third wheel and the fourth wheel is worn, the control unit 134 performs the required braking force following control on the front wheel and the braking force maintenance control on the rear wheel (S1060).

When it is determined in Step S1050 that the friction pad states of the third and fourth wheels are not worn, the control unit 134 alternately performs the braking force maintenance control and the required braking force following control for the front and rear wheels (S1070).

For example, when the wear of the friction pads of the front and rear wheels is not detected, the control unit 134 alternately performs the braking force maintenance control and the required braking force following control on the front and rear wheels at specific cycles in order to detect whether the friction pad is worn.

Various implementations of the systems and techniques described herein may be realized by digital electronic circuits, integrated circuits, field programmable gate arrays (FPGAs), application specific integrated circuits (ASICs), computer hardware, firmware, software, and/or a combination thereof. These various implementations may include being implemented as one or more computer programs executable on a programmable system. A programmable system includes at least one programmable processor (which may be a special purpose processor or may be a general-purpose processor) coupled to receive data and instructions from and transmit data and instructions to a storage system, at least one input device, and at least one output device. Computer programs (also known as programs, software, software applications or code) contain instructions for a programmable processor and are stored on a "computer readable medium".

In the flowchart/timing diagram of this specification, it is described that each process is sequentially executed, but this is merely an example of the technical idea of one embodiment of the present disclosure. In other words, a person with ordinary knowledge in the technical field to which one embodiment of the present disclosure belongs may change and execute the order described in the flowchart/timing diagram within the range that does not deviate from the essential characteristics of one embodiment of the present disclosure, or may apply various modifications and variations by executing one or more of the processes in parallel, and thus, the flow chart/timing chart is not limited to a time-series sequence.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof

What is claimed is:

1. A method of braking control of a vehicle having an electro-mechanical brake disposed in each wheel of the vehicle, the method comprising:
generating an actual motor current of each wheel and an actual stroke of each wheel by collecting a voltage signal from a current sensor and a motor rotation angle sensor mounted on the electro-mechanical brake, wherein the actual stroke of each wheel refers to a displacement of a pressing unit of the electro-mechanical brake that applies pressure to a friction pad in the electro-mechanical brake;
determining whether a friction pad wear compensation function of each wheel is activated based on the actual motor current of each wheel and the actual stroke of each wheel;

determining a friction pad state of each wheel using the actual motor current of each wheel, the actual stroke of each wheel, and reference data of the electro-mechanical brake, in response to a determination that the friction pad wear compensation function is activated;

calculating an amount of friction pad wear of each wheel using the actual motor current of each wheel, the actual stroke of each wheel, and the reference data of the electro-mechanical brake and calculating a target stroke of each wheel using the amount of the friction pad wear of each wheel, in a case in which the friction pad state of each wheel is worn; and performing braking control of the vehicle based on the target stroke of each wheel.

2. The method of claim 1, wherein the reference data of the electro-mechanical brake is generated based on the actual stroke and the actual motor current for a plurality of check points at each initialization of the electro-mechanical brake and is used to determine a reference stroke for a target clamping force of each wheel corresponding to a required braking force of the vehicle and determine a reference motor current according to the reference stroke.

3. The method of claim 1, wherein the determining of whether the friction pad wear compensation function of each wheel is activated includes:

determining a validity of the actual motor current of each wheel and the actual stroke of each wheel, and determining whether the friction pad wear compensation function of each wheel is activated based on the actual motor current of each wheel and a determination result of the validity.

4. The method of claim 3, wherein the determining the validity of the actual motor current of each wheel and the actual stroke of each wheel includes: determining that the actual motor current of each wheel and the actual stroke of each wheel are valid, when the actual motor current of each wheel and the actual stroke of each wheel are greater than or equal to a minimum stroke and a minimum motor current indicating a boundary of a linear section for the reference data of the electro-mechanical brake, respectively.

5. The method of claim 3, wherein the determining whether the friction pad wear compensation function of each wheel is activated based on the determination result of the validity and the actual motor current of each wheel includes:

calculating a braking holding time of each wheel based on the actual motor current of each wheel, and determining whether the friction pad wear compensation function of each wheel is activated according to the braking holding time of each wheel.

6. The method of claim 5, wherein the calculating the braking holding time of each wheel based on the actual motor current of each wheel includes:

increasing the braking holding time of each wheel when the actual motor current of each wheel and the actual stroke of each wheel are valid and the actual motor current of each wheel is maintained within a first threshold value, and increasing a braking change time of each wheel when the actual motor current of each wheel is not maintained within the first threshold value.

7. The method of claim 6, wherein the braking holding time of each wheel maintains a previous value when the braking change time of each wheel is less than or equal to a second threshold value, and the braking holding time of each wheel is initialized to zero when the braking change time of each wheel is greater than the second threshold value.

8. The method of claim 5, wherein the determining whether the friction pad wear compensation function of each wheel is activated according to the braking holding time of each wheel includes:

determining that the friction pad wear compensation function of each wheel is activated when the braking holding time of each wheel is greater than a third threshold value, and determining that the friction pad wear compensation function of each wheel is deactivated when the braking holding time of each wheel is less than or equal to the third threshold value.

9. The method of claim 1, wherein the determining the friction pad state of each wheel using the actual motor current of each wheel, the actual stroke of each wheel, and the reference data of the electro-mechanical brake includes:

determining that the friction pad state of each wheel is worn when a difference between the reference motor current corresponding to the actual stroke of each wheel and the actual motor current of each wheel is greater than a fourth threshold value, and determining that the friction pad state of each wheel is normal when the difference between the reference motor current corresponding to the actual stroke of each wheel and the actual motor current of each wheel is smaller than or equal to the fourth threshold value.

10. The method of claim 2, wherein the calculating the amount of the friction pad wear of each wheel using the actual motor current of each wheel, the actual stroke of each wheel, and the reference data of the electro-mechanical brake and the calculating the target stroke of each wheel include:

calculating the amount of the friction pad wear of each wheel by subtracting a reference stroke corresponding to the actual motor current of each wheel from the actual stroke of each wheel and calculating the target stroke of each wheel by adding the amount of the friction pad wear of each wheel to the reference stroke.

11. The method of claim 1, further comprising: calculating an accumulated amount of the friction pad wear of each wheel based on the amount of the friction pad wear of each wheel.

12. The method of claim 11, wherein the calculating the accumulated amount of the friction pad wear of each wheel based on the amount of the friction pad wear of each wheel includes:

calculating the accumulated amount of the friction pad wear of each wheel by adding the amount of the friction pad wear of each wheel to a previous accumulated amount of friction pad wear of each wheel.

13. The method of claim 2, wherein the performing the braking control of the vehicle based on the target stroke of each wheel includes:

performing the braking control of the vehicle based on the target stroke of each wheel when a change rate of the required braking force is less than or equal to a fifth threshold, and performing wear compensation coordinated braking control based on the target stroke of each wheel when the change rate of the required braking force is greater than the fifth threshold value.

14. The method of claim 13, wherein the wear compensation coordinated braking control includes:

alternately performing braking force maintenance control and required braking force following control for front and rear wheels of the vehicle when the friction pad state of at least one of the front or rear wheels of the vehicle is not worn, and alternately performing the braking force maintenance control and the required braking force following control for the front wheel and the rear wheel even when the friction pad state of at least one of the front wheels of the vehicle is worn and the friction pad state of at least one of the rear wheels of the vehicle is worn.

15. The method of claim 14, further comprising:

performing the braking force maintenance control on the front wheel and the required braking force following control on the rear wheel when the friction pad state of at least one of the front wheels of the vehicle is worn and the friction pad state of at least one of the rear wheels of the vehicle is not worn, and performing the required braking force following control on the front wheel of the vehicle and the braking force maintenance control on the rear wheel when the friction pad state of at least one of the front wheels of the vehicle is not worn and the friction pad state of at least one of the rear wheels of the vehicle is worn.

16. An electric brake apparatus having an electro-mechanical brake disposed in each wheel of a vehicle and configured to perform braking control of the vehicle, the electric brake apparatus comprising:

a friction pad configured to press a brake disc of each wheel;

a pressing unit configured to generate a clamping force by pressing the friction pad against the brake disc;

a motor configured to generate a rotational force and transmit the rotational force to the pressing unit;

a current sensor mounted on the electro-mechanical brake to measure current flowing through the motor;

a motor rotation angle sensor mounted on the electro-mechanical brake to detect a rotation angle of the motor and output a rotation angle signal; and a main controller configured to calculate an actual motor current of each wheel based on a voltage signal input from the current sensor, calculate an actual stroke of each wheel using the rotation angle signal input from the motor rotation angle sensor, determine whether a friction pad wear compensation function of each wheel is activated based on the actual motor current of each wheel and the actual stroke of each wheel, determine a friction pad state of each wheel using the actual motor current of each wheel, the actual stroke of each wheel, and reference data of the electro-mechanical brake, in response to a determination that the friction pad wear compensation function is activated, calculate an amount of friction pad wear, in a case in which the friction pad state of each wheel is worn, calculate a target stroke using the amount of friction pad wear, and perform the braking control of the vehicle based on the target stroke, wherein the actual stroke of each wheel refers to a displacement of the pressing unit that applies pressure to the friction pad.

17. The electric brake apparatus according to claim 16, wherein the main controller is configured to calculate the amount of friction pad wear using the actual motor current, the actual stroke, and the reference data of the electro-mechanical brake.

18. The electric brake apparatus according to claim 17, wherein the reference data of the electro-mechanical brake is generated based on the actual stroke and the actual motor current for a plurality of check points at each initialization of the electro-mechanical brake and is used to determine a reference stroke for a target clamping force corresponding to a required braking force of the vehicle and determine a reference motor current according to the reference stroke.

19. The electric brake apparatus according to claim 17, wherein the main controller is further configured to determine a validity of the actual motor current of each wheel and the actual stroke of each wheel, and determine whether the friction pad wear compensation function of each wheel is activated based on the actual motor current of each wheel and a determination result of the validity.

20. The electric brake apparatus according to claim 19, wherein the main controller is further configured to determine that the actual motor current of each wheel and the actual stroke of each wheel are valid, when the actual motor current of each wheel and the actual stroke of each wheel are greater than or equal to a minimum stroke and a minimum motor current indicating a boundary of a linear section for the reference data of the electro-mechanical brake, respectively.

* * * * *